Patented Feb. 28, 1950

2,499,226

UNITED STATES PATENT OFFICE 2,499,226

RESINOUS AROMATIC ACID SALTS OF A GUANIDINE AS MOTHPROOFERS

Vartkes Migrdichian, Greenwich, Conn., assignor to American Cyanamid Company, New York, N. Y., a corporation of Maine No Drawing. Continuation of application Serial No. 317,174, February 3, 1940. This application November 23, 1944, Serial No. 564,897

2 Claims. (Cl. 167—37)

The present invention relates to salts of aromatic acids containing a guanidine group, which are resinous or non-crystalline in character, useful as mothproofing agents.

There is on the market today, a mothproofing composition, the active ingredient of which is dixylyl guanidine oleate dissolved in petroleum naphtha. The fact that cloth treated with a heavy dose of the above composition acquires a greasy feel is objectionable.

The principal object of the present invention, therefore, is to provide a guanidine or substituted guanidine salt suitably soluble for application to fabric which will effectively protect such cloth against the ravages of the carpet beetle and/or webbing clothes moth larvae without taking on this objectionable feel, even in heavy dosages.

It has been discovered that salts of guanidines or substituted guanidines may be obtained by reacting the free guanidine or substituted guanidine with aromatic acids. A large number of these compounds have been prepared and the very remarkable discovery made that all of these salts are of a resinous character. This is a desirable characteristic in a substance used for mothproofing in that it has a tendency to adhere to the fabric when deposited thereon from its solution. In the case of crystalline material, the deposited crystals of the salt may be brushed or rubbed therefrom with consequent loss of mothproofing characteristics.

While the dixylyl guanidine salt of an aromatic acid is preferred, yet other mono or poly substituted guanidine salts thereof are useful, such as those of the alkyl, aryl, and alkyl aryl groups, as well as the unsubstituted guanidine salts. Any of the aromatic acids may be used, such as benzoic, salicylic, anthranilic, phthalic, or the like.

These compounds may be readily prepared by dissolving the acid in alcohol, adding the equivalent quantity of the free guanidine or substituted guanidine, and evaporating off the excess alcohol. They may also be made by adding equivalent quantities of the guanidine or guanidine compound to the molten acid.

These guanidine and substituted guanidine salts are fusible, so that an alternative convenient method of preparing them is to add a mixture in equivalent quantities of the acid and the free guanidine or substituted guanidine to the fused guanidine salt, heating until all solid disappears, whereupon combination to the salt takes place almost instantaneously.

Still another method which avoids the necessity of evaporating off large quantities of alcohol, is to dissolve a small portion of the mixture of the acid and free or substituted guanidine in warm alcohol and adding more of the mixture while the liquid is kept hot. Proceeding in this manner and starting with a comparatively small quantity of alcohol, any amount of the corresponding salt containing the guanidine group may be prepared. The small amount of alcohol in the final product is not objectionable and may be eliminated if so desired by grinding the chilled product and drying in the usual manner.

These compounds are not soluble to any great extent in petroleum fractions but are to a limited extent in chlorinated hydrocarbons and in aromatic hydrocarbons. They are quite soluble in alcohol. The solubility of these compounds in petroleum hydrocarbons may be increased by the addition of alcohol. To the alcoholic solutions thereof, large proportions of tetrachloride may be added without causing precipitation. The addition of this last substance to their alcoholic solutions, in a quantity at least equal to the amount of alcohol used, to a large degree eliminates the fire hazard attendant upon the use of alcohol alone.

From 1 to 5% of the guanidine compound may be readily dissolved in an ethyl alcohol-carbon tetrachloride mixture containing 10% of the alcohol. Such solutions may be sprayed on the cloth at the rate of one gallon to from ten to thirty pounds of cloth, or the cloth may be dipped in the solution, wrung out and then dried.

A medium weight white wool flannel, a brown wool cloth and a woolen suiting were used in a series of tests with salts of the above acids containing a guanidine group. The compounds were applied in solution in a mixed alcohol-carbon tetrachloride solvent at various rates and the resistance of the treated pieces to the attack of black carpet beetle and webbing clothes moth larvae tested. All solutions contained a quantity of the guanidine salt equivalent to approximately 3%. All samples of cloth which had had an application equivalent to as much as one gallon per ten pounds of cloth had complete protection. This resistance to destruction by the above insects was ineffective only when the application dropped to one-third of a gallon per ten pounds of cloth. The present application is a continuation of my copending application Serial No. 317,174, filed February 3, 1940, now abandoned.

Many of the above substances are new chemical compounds.

While the invention has been described with particular reference to specific embodiments, it is to be understood that it is not to be limited thereto but is to be construed broadly and restricted solely by the scope of the appended claims.

I claim:

1. A mothproofing composition containing a guanidine salt of benzoic acid dissolved in a mixture of ethyl alcohol and carbon tetrachloride.

2. A mothproofing composition containing a dixylyl guanidine salt of benzoic acid dissolved in a mixture of ethyl alcohol and carbon tetrachloride.

VARTKES MIGRDICHIAN.

REFERENCES CITED

The following references are of record in the file of this patent:

UNITED STATES PATENTS

| Number | Name | Date |
|---|---|---|
| 2,131,127 | ter Horst | Sept. 27, 1938 |
| 2,145,214 | Jayne | Jan. 24, 1939 |
| 2,233,680 | Sibley | Mar. 4, 1941 |
| 2,256,759 | Ham | Sept. 23, 1941 |
| 2,347,688 | Jayne | May 2, 1944 |